United States Patent

Hookham

Patent Number: 5,253,403
Date of Patent: Oct. 19, 1993

[54] ON-STREAM TIME FOR EBULLATING BED REACTOR

[75] Inventor: David E. Hookham, Houston, Tex.

[73] Assignee: McDermott International, Inc., New Orleans, La.

[21] Appl. No.: 13,262

[22] Filed: Feb. 1, 1993

Related U.S. Application Data

[63] Continuation of Ser. No. 878,208, May 4, 1992, Pat. No. 5,211,917.

[51] Int. Cl.$^5$ ............................................. B23P 5/16
[52] U.S. Cl. ................................. 29/163.6; 29/401.1; 208/161; 208/162; 422/139; 422/140
[58] Field of Search ............ 422/139, 140, 143, 239, 422/311, 276, 277, 227; 34/57 A, 10, 57 B, 57 R; 210/164, 460; 208/463, 161, 162; 29/906, 163.6, 401.1

[56] References Cited

U.S. PATENT DOCUMENTS

| | | | |
|---|---|---|---|
| 3,124,518 | 3/1964 | Guzman et al. | 422/140 |
| 3,131,212 | 4/1964 | Biller | 422/227 |
| 3,523,763 | 8/1970 | Van Driesen et al. | 422/140 |
| 3,523,888 | 8/1970 | Stewart et al. | 422/140 |
| 3,679,576 | 7/1972 | McDonald | 422/190 |
| 4,221,653 | 9/1980 | Chervenak et al. | 422/140 |
| 4,374,094 | 2/1983 | Farnham | 422/218 |
| 4,874,583 | 10/1989 | Colvert | 422/140 |
| 4,911,893 | 3/1990 | Cox | 422/140 |
| 4,971,678 | 11/1990 | Strickland | 208/162 |

Primary Examiner—Robert J. Warden
Assistant Examiner—Hien Tran
Attorney, Agent, or Firm—Robert J. Edwards; Michael L. Hoelter

[57] ABSTRACT

A downcomer for use in ebullating bed reactors that is perforated along its length within the reactor. These perforations are sized slightly smaller that the solid catalyst particles used in the reactor in order to screen out these solid particles and prevent their flow or movement into the downcomer from the reactor. As a result of the perforated downcomer, any liquid separated from the fluidized medium and collected in the downcomer will flow back through these perforations and into the reactor when the ebullating bed is operating at its normal level; however, when the ebullating bed is operating at an upset level condition, the liquid in this fluidized medium will flow in the opposite direction and will pass through these perforations into the downcomer in order to maintain a minimum flow to the ebullating pumps.

2 Claims, 2 Drawing Sheets

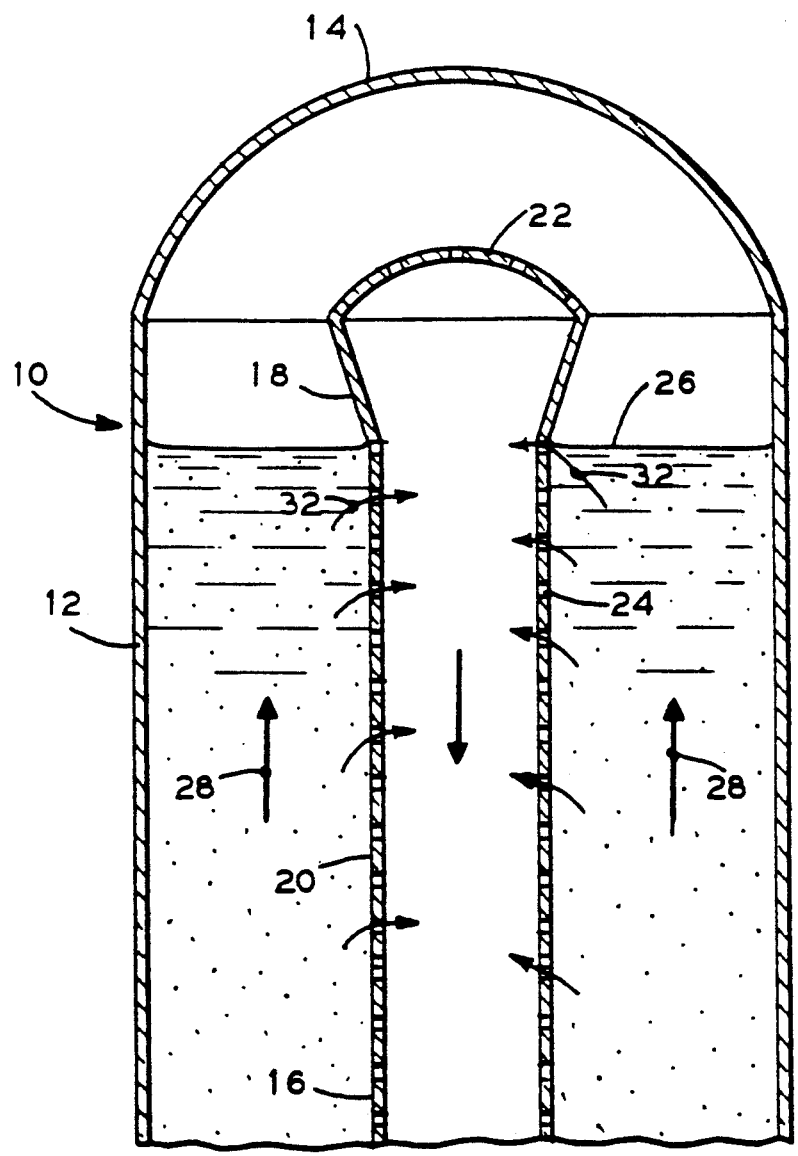

ON-STREAM TIME FOR EBULLATING BED REACTOR

This application is a continuation of application Ser. No. 07/878,208, filed May 4, 1992, now U.S. Pat. No. 5,211,917.

FIELD OF THE INVENTION

This invention pertains to ebullating bed reactors in general and more particularly to a newly designed downcomer located within an ebullating bed reactor for enhancing liquid-solid separation thereby resulting in less operating down time.

BACKGROUND OF THE INVENTION

There are a number of commercial processes that utilize a liquid phase, ebullating bed reactor. Some examples, of these include H-Oil (heavy oil) and LC-Finning (Lummus-Citgo Finning) units. These reactors consist of a bubbling liquid or medium that causes the solid catalyst therein to remain fluidized. To enhance this fluidized state, a gas reactant is introduced into the liquid at the bottom of the reactor and leaves at the top along with any liquid throughput or carryover. When this bubbling liquid within the reactor reaches a certain height, it is separated out from the gas by spilling over into a recycle cup. This removed liquid then flows through a downcomer tube which returns the collected liquid to ebullating pumps for subsequent recirculation within the reactor. Any vapor product from the reactor, along with any unconverted liquid, exits the reactor and flows to the downstream recovery section of the process.

A major cause of down-time in ebullating bed reactors is due to an interruption in liquid or gas flow within the reactor. When the liquid level in the reactor falls below the top opening of the downcomer, no liquid is returned to the ebullating pumps thereby causing them to stop operating. Any number of process conditions can cause such a loss of liquid flow or such a reduction in liquid level. Some of these conditions are quite minor, such as changes in composition of feed or a partial loss of flow from the recycle compressor. As a result, the reactor is usually only on-stream about 80% to 90% of the time. When ebullation or fluidization is lost, the catalyst slumps and although feed may continue if this condition is not detected, heat is not removed to any significant degree. Thus, the unit must be shut down for a considerable period of time before ebullation can be re-established. In addition, past cases of lost circulation have resulted in catastrophic failure of ebullating units.

In U.S. Pat. No. 3,523,763 to Van Driesen et al., there is disclosed a catalytic reactor having a central recycle conduit designed for gas-liquid separation. The upper region of this conduit contains numerous, equally spaced openings which are partially blocked so as to restrict the amount and kind of gas-liquid separation that can occur. Such an upper location of these openings is to enhance the gas-liquid separation occurring in that region of the reactor. While this patent is intended to improve normal operation and further gas-liquid separation, it is not designed to reduce or prevent upset conditions from causing the reactor to shut down nor is it designed for liquid-solid separation nor is it designed for such separation along the length of the conduit as is currently needed.

It is thus an object of this invention to provide an ebullating bed reactor that is configured so that such down time is minimized. A further object of this invention is to provide a downcomer that can recirculate fluid back to the ebullating pumps even should the liquid level fall well below the elevation of its top opening. Still another object of this invention is to provide a downcomer that enhances liquid-solid separation both while the liquid is at its normal operating level and when the liquid is below such level. Yet another object of this invention is to eliminate or reduce the occurrence of upset conditions within the reactor which would cause the reactor to shut down. These and other objects and intentions will be obvious upon further investigation.

SUMMARY OF THE INVENTION

This invention pertains to a perforated downcomer for use in ebullating bed reactors in order to enhance liquid/solid separation therein. The downcomer consists of an elongated return line that is in communication with one or more ebullating pumps with this return line being perforated along its entire length within the reactor. A top cup is secured to the upper region of this return line with this top cup having a perforated cover thereover. If desired, this cover may also contain a number of small cyclone separators to enhance liquid/gas separation within the reactor. The perforations in both the return line and the cover are sized smaller than the size of any solid catalyst particle used in the ebullating bed reactor. Additionally, these perforations are uncovered and unblocked thereby providing an open and unrestricted passageway for free liquid flow between the inside and the outside of the downcomer along the entire length of the return line. Furthermore, the density of the perforations in the return line is greater at a higher elevation thereof than occurs at the base of the return line.

BRIEF DESCRIPTION OF THE DRAWINGS

FIG. 2 is a schematic side view of the invention, partially cut away, showing the liquid flow when the fluidizing medium is below its normal operating level, such as would normally cause an upset.

DETAILED DESCRIPTION OF THE DRAWINGS

Figure 1:
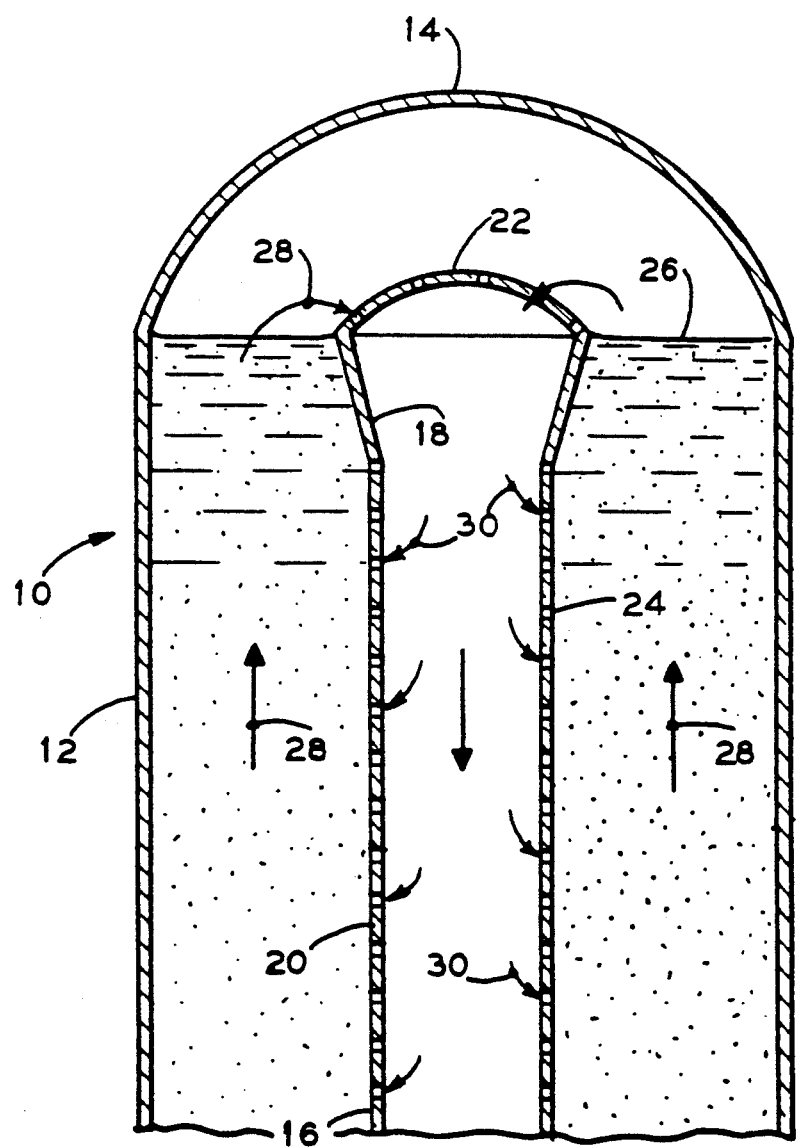
FIG. 1 is a schematic side view of the invention, partially cut away, showing the liquid flow when the fluidizing medium is at its normal operating level.

Referring to the drawings, there is shown ebullating bed reactor 10 which consists of, among other items, outer walls 12, top 14, and downcomer 16. Downcomer 16 is configured with an upper outwardly flared top cup 18 and generally cylindrical or tubular return line 20. Top cup 18 can be open to the upper region of reactor 10 but it is normally covered with perforated cover 22. If desired, cover 22 can also be configured with a number of small cyclone separators (not shown) in order to enhance liquid-gas separation at the top of downcomer 16.

Return line 20 is, as shown in FIGS. 1 and 2, perforated along its length (about the distance of 50 diameters or so) within reactor 10. Ideally, these perforations 24 are sized slightly smaller than the solid catalyst particles used in reactor 10 in order to prevent any such solid particle from flowing into downcomer 16 thereby facilitating liquid-solid separation within reactor 10. While perforations 24 may extend evenly along the length of downcomer 16, it is desirable for a greater number of them to be located at an upper region of downcomer 16. In any event, these perforations permit liquid flow through the walls of downcomer 16 thereby screening out any solids (and thus enhancing liquid-solid separation) which is the desired result.

Referring now to FIG. 1, under normal operating conditions of reactor 10, fluid 26 is at the level of or just below that of the top of top cup 18. As shown by the arrows, liquid portion 28 of fluid 26 will flow upward until it reaches its normal operating height afterwhich it will spill over into top cup 18 through perforated cover 22. Only the heavy liquid portion 28 of fluid 26 will enter top cup 18 because any vapor therein will continue to rise to the top of reactor 10 while any solid catalyst in fluid 26 will be screened out due to the selected size of perforations 24 in cover 22. It should be understood that current catalyst manufacturing and operating procedure is to remove catalyst pellets before significant attrition occurs.

Normally, this liquid portion 28 in downcomer 16 will flow directly to ebullating pumps (not shown) via return line 20, but if there is any significant accumulation of liquid 28 within return line 20, the pressure created therein will cause any such liquid to seek equilibrium by exiting line 20 via perforations 24 thereby re-entering reactor 10 as shown by arrows 30. If the height of liquid portion 28 within downcomer 16 is high enough, the static liquid head pressure within return line 20 will be greater than the pressure of the bubbling fluid 26 outside return line 20. Thus, some of this liquid portion 28 will have already left downcomer 16 through perforations 24 before reaching the ebullating pumps. However, if the static head pressure of liquid portion 28 within return line 20 is not greater than the pressure outside return line 20, this liquid portion 28 will remain within return line 20 and will be delivered to the pumps. Similarly, should the level of liquid portion 28 within downcomer 16 fall below the equilibrium level, additional liquid will enter return line 20 via the many perforations 24 along the length of return line 20. Thus, a continuous flow of liquid 28 to ebullating pumps is maintained.

Referring now to FIG. 2, there is shown an upset condition wherein the level of fluid 26 is below the opening of top cup 18. In this case, since there will be no liquid passing through perforated cover 22 and the catalyst bed has slumped, liquid flow is maintained to ebullating pumps by the passage of liquid 28 through perforations 24 along the length of return line 20 (see arrows 32). Thus, even though the fluid level may fall below that of the top of downcomer 16, flow to the ebullating pumps is maintained thereby avoiding the occurrence of an upset condition which could result in the shut-down of reactor 10.

As stated above, perforations 24 are sized slightly smaller that the size of the solid catalyst particles within fluid 26. This is to encourage the separation of the liquid portion 28 of fluid 26 from these solid particles. Also, the number of holes within return line 20 is calculated to provide a minimum flow to the ebullating pumps. As a result of this, there is a greater density of perforations 24 in the upper region (top cup 18 region) of downcomer 16 than at its base. Finally, because of the size of the catalyst particles and the fact that these particles tend to maintain their shape over their normal residence period in reactor 10, there is no need to vary the size of perforations 24 or to provide a cover partially blocking them since there will be few catalyst fines to contend with.

During such an upset condition (fluid level below the top of downcomer 16), the liquid flow rate within return line 20 will be at a minimum thereby encouraging further gas disengaging within downcomer 16. This improved disengaging becomes necessary since gas will enter downcomer 16 through perforations 24 along with liquid portion 28. During this minimum flow condition, the catalyst bed will not be fully fluidized, or it may be completely stationary. However, flow to the ebullating pumps will still be greatly increased over the base feed rate and heat removal will still occur. This ability to carry away heat during an upset condition will prevent coking in the catalyst bed and will allow for a rapid restart. Ideally, most of the perforations 24 in downcomer 16 will be placed above the slumped bed level to prevent occlusion by catalyst particles. The remaining perforations 24 located below the slumped bed level allow the liquid portion 28 to drain into downcomer 16 whenever inventory falls to such a level.

Thus, this new design for perforated downcomer 16 allows the inventory of the liquid portion 28 held outside return line 20 to continue to circulate, albeit at a lower level due to the occurrence of the upset condition. This aids in overcoming the major cause of non-productive time in ebullating bed reactors 10.

What is claimed is:

1. In a method of making an ebullating bed reactor comprising providing a reactor vessel, an ebullating means and a downcomer means defined by an elongated return line of uniform diameter located within the reactor vessel, wherein the improvement comprises the steps of:
   (a) perforating the elongated return line along its length with a plurality of perforations and spacing a greater number of said perforations at an upper region of the elongated return line than at a lower region of the elongated return line;
   (b) securing an unperforated, upwardly and outwardly flared top cup assembly atop said upper region of the elongated return line;
   (c) perforating a cover secured over said unperforated, upwardly and outwardly flared top cup assembly;
   (d) constructing and arranging said perforations in the elongated return line so as to permit a liquid slurry in the reactor vessel to pass therethrough;
   (e) constructing and arranging said perforations in the elongated return line so as to prevent a majority of solid catalyst particles outside the elongated return line from passing therethrough into the elongated return line, said perforations being uncovered and unblocked;
   (f) constructing and arranging said perforations so that when a liquid level within the reactor vessel falls below a level of said unperforated, upwardly and outwardly flared top cup assembly, a predetermined minimum quantity of said liquid slurry is permitted to flow out of the reactor vessel into the elongated return line, whereby, when said liquid level within the reactor vessel is equal with or above said level of said unperforated, upwardly and outwardly flared top cup assembly, said liquid slurry flows from the elongated return line into the reactor vessel through said perforations, and whereby when said liquid level within the reactor vessel falls below a level of said solid catalyst particles within the reactor vessel, said liquid slurry flows from the reactor vessel into the elongated return line through said perforations.

2. In a method for increasing liquid solid separation in an ebullating bed reactor containing a liquid slurry and solid catalyst particles, comprising providing an ebullating bed reactor incorporating an elongated return line therein with an unperforated, upwardly and outwardly flared top cup assembly affixed to an upper region of the elongated return line, wherein the improvement comprises the steps of:

separating the solid catalyst particles from the liquid slurry by passing the liquid slurry through a plurality of perforations in a length of the elongated return line; wherein, the elongated return line is constructed and arranged to have a generally uniform diameter;

a greater number of said perforations are located at the upper region of the elongated return line than at a lower region of the elongated return line;

a perforated cover is secured over the top cup assembly;

said perforations are constructed and arranged to prevent the solid catalyst particles in the ebullating bed reactor from passing into the elongated return line thereby providing an open liquid passageway therethrough; and, said perforations are constructed and arranged so that when a liquid level within the ebullating bed reactor falls below a level of the top cup assembly, a predetermined minimum quantity of the liquid slurry is permitted to continue to flow out of the ebullating bed reactor into the elongated return line.

* * * * *